Aug. 11, 1931.                V. E. ROSEN                1,818,010

ELECTRICAL CONDENSER AND METHOD OF MANUFACTURING THE SAME

Filed Feb. 3, 1923

INVENTOR
Victor E. Rosen
BY
Philip Farnsworth
ATTORNEY

Patented Aug. 11, 1931

1,818,010

UNITED STATES PATENT OFFICE

VICTOR E. ROSEN, OF WALTHAM HIGHLANDS, MASSACHUSETTS, ASSIGNOR TO WIRELESS SPECIALTY APPARATUS COMPANY, OF BOSTON, MASSACHUSETTS, A CORPORATION OF NEW YORK

ELECTRICAL CONDENSER AND METHOD OF MANUFACTURING THE SAME

Application filed February 3, 1923. Serial No. 616,640.

This invention relates to improvements in electrical condensers of the sheet type and methods of manufacturing the same.

An object of the invention is a condenser having a simple construction of low cost.

Figure 1:
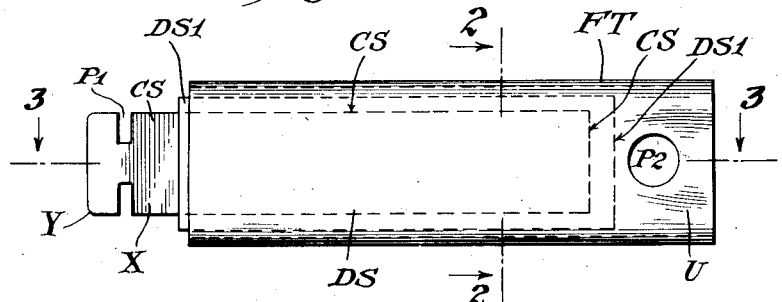
Figure 2:
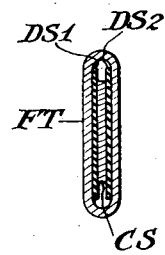
Figure 3:
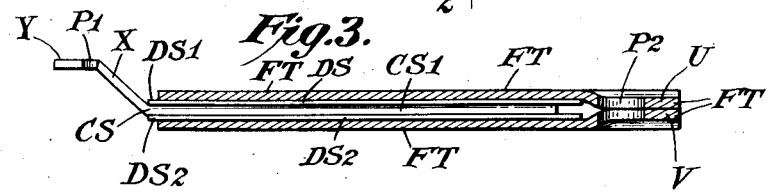
Figure 4:
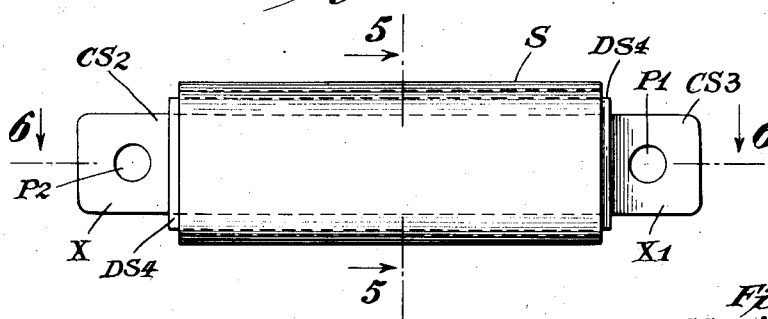
Figure 5:
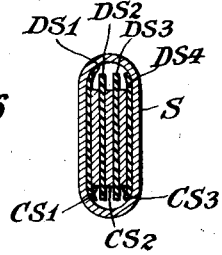
Figure 6:
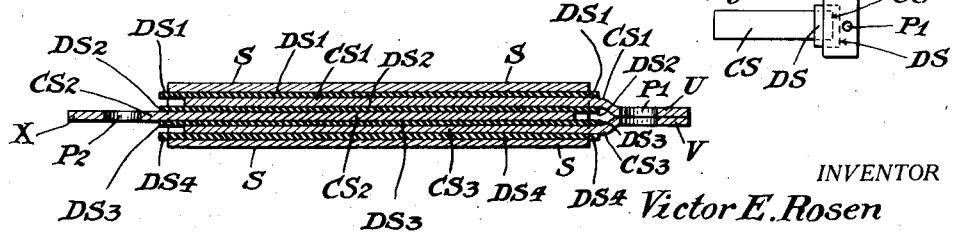

The invention consists of the constructions and arrangements shown in the drawings of which Figure 1, 2 and 3 show one form; Figs. 4, 5 and 6 show another; and Figs. 7 and 8 respectively show two other forms.

Of the first form, Fig. 1 is a plan, Fig. 2 a section at 2—2 of Fig. 1, and Fig. 3 is a section at 3—3 of Fig. 1.

Of the second form, Fig. 4 is a plan, Fig. 5 a section at 5—5 of Fig. 4, and Fig. 6 is a section at 6—6 of Fig. 4.

Figure 7:
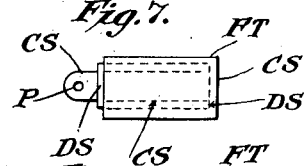
Figure 8:
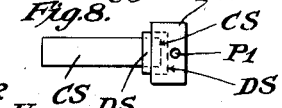

Fig. 7 is a plan of a third form, and Fig. 8 is a plan of a fourth form.

In Fig. 1, the condenser consists of a metal sheath FT enveloping the sides of two dielectric sheets DS1, DS2 (Fig. 2) which respectively lie on opposite sides of a conducting sheet CS and separate the latter from metal sheath FT. Thus the enveloping sheath FT constitutes two of the conducting sheets of the condenser, the third conducting sheet thereof being the central sheet CS; and one dielectric sheet DS1 separates the inner conducting sheet CS from one part of sheath FT, and the other dielectric sheet, DS2, separates the inner sheet CS from the other portion of outer sheath FT. The sheath FT also constitutes one terminal of the condenser, and inner sheet CS extends at the left out of and beyond sheath FT to constitute the other terminal of the condenser. Both dielectric sheets extend out of and slightly beyond one end of sheath FT (see DS1, Fig. 1). Inner conducting sheet CS extends out of and beyond the same end of sheath FT and out of and beyond said extensions of the dielectric sheets; and the portion of the sheet X which extends beyond the mica sheets constitutes the other terminal of the condenser of which the first terminal is metal sheath FT.

The right-hand ends of the dielectric sheets (see DS1, Fig. 1) project beyond the inner conducting sheet CS; and sheath FT projects at the same end of the condenser beyond the dielectric sheets. The parts U, V of sheath FT (Figs. 1 and 2) which project to the right are compressed together, and may be perforated as at P2 to constitute a convenient manner of mounting and connecting this condenser terminal. At the left, the inner conducting sheet CS, having the terminal-extending portion X, is provided with slots P1 between a further extended portion Y and the extension X, all for the purpose of providing another convenient terminal arrangement.

In the form of Figs. 1–3, the inner conducting sheet CS, constituting one of the conducting condenser-elements, may consist of copper; and dielectric sheets DS1 and DS2 may be and preferably are of mica.

In Figs. 1–3, the conducting sheeth FT is of some malleable metal, i. e., of a metal which readily can be deformed or pressed into shape and which thereafter will retain that shape or position.

In manufacture, the mica sheets are applied on the two faces of inner conductor sheet CS and thereupon the metal of sheath FT is applied around the sides of the mica-covered inner sheet. Thereupon the sheath, in its position enveloping the elements of the condenser within it, is subjected to sufficient pressure to deform it and cause it to assume a shape whereby it grips the outer faces of the mica sheets and forces them against the intervening copper sheet CS so as to hold the mica and copper sheets together within the sheath itself in a permanent unitary structure therewith.

In practice, the best method is to employ a sheath FT which is in the form of a length of copper tubing of standard commercial construction and readily procurable in long lengths, from which portions are cut off for this use. The inner elements of the condenser then are inserted in such desired length of tubing, and the whole subjected to action of a press to cause the copper tube to assume a shape substantially corresponding with that of the interior mica and copper sheets, i. e., a substantially flat form, in which shape or condition the now flat tube grips and holds the interior parts as above described. This construction is simple but effective, and plainly of low cost. In the manufacture, it is important that the materials of the device be very clean in order to produce a condenser having a low phase angle. The finished condenser should be impregnated in paraffin wax to prevent any subsequent change in its capacity. This condenser is more particularly adapted for low potential service. It can be made up conveniently in small sizes having a capacity of the order of, say, two one-thousandths of a microfarad more or less. Such a condenser having a capacity of two ten-thousandths of a microfarad may have mica sheets one and one-half mils thick and having an active area of two-thirds of a square inch.

The form of Figs. 4–6 may be constructed as above described, but differs from that of Figs. 1–3 in that inside the outer sheath S are a plurality of dielectric sheets (DS1—DS4) and a plurality of conducting sheets (CS1—CS3). The metal sheet CS2 is extended at the left to constitute one terminal X at the left (Fig. 6). At the right, the two outer sheets CS1 and CS3 are extended to terminate in adjacent contacting portions U, V to constitute the other condenser terminal. The sheath S may be of malleable metal as in Fig. 1, and when made of metal it may constitute the condenser terminal alternative with left-hand terminal X. The form shown (whether sheath S be of conducting material or not) is suitable for use in certain radio receiver circuits as of the so-called "reflex" type, in which case the right-hand terminal U, V may be connected to the negative terminal of the "A" battery. In general, any form of the invention is suitable as a by-pass condenser in radio frequency circuits.

Of whatever material sheath S may be composed, the final product preferably is such that, as a result of the nature of the material and its condition enveloping the interior parts, said parts are gripped by the enveloping sheath to hold them together in a unitary structure with one another and with the sheath itself. Various suitable materials and methods of effecting such final condition will be suggested to skilled persons by this disclosure.

In Fig. 7 is shown a form similar to that of the above two forms. From the flat tube FT, an inner conducting sheet CS projects at the left. This projection has a perforation P adapting it for mounting or connection as one terminal of the condenser. The flat tube FT does not extend far to the right beyond inner sheet CS, but as to its extent shown, it is adapted by its substantially flat form (as in Figs. 1 and 4) to serve as the blade of a knife switch, the entire condenser being pivoted at P to a fixed conducting part of the switch in a widely-used manner, so that the entire condenser can swing on such pivot in such manner that the condenser will be put in circuit when the switch is closed and removed from the circuit when the switch is opened. The forms of Figs. 1 and 4 are likewise adapted as elements of blades of such a knife switch, but for such use the extra extended portions of the members in Figs. 1 and 4 are not necessary.

In Fig. 8 is shown another form adapted as a switch blade. In this form, the sheath FT itself may be mounted at the pivot of the switch as at P1; and the switch blade comprises the inner conducting sheet CS shown as extending at the left out of and beyond sheath FT. In both Figs. 7 and 8, as in the other figures, the inner and outer members of the condenser or switch blade are electrically separated from one another by the dielectric sheets DS.

In any form of the invention, either or both of the following two features may be employed. First, the above feature wherein the sheath, by the nature of its material and its position relative to the interior condenser elements, itself acts to grip the interior elements to hold them in a unitary structure with one another and with the sheath itself. Second, the construction wherein the sheath, being of metal, may constitute one terminal of the condenser. In the preferred and simplest form as shown in Fig. 1, the particular metal employed is one that, in addition to permitting use of the sheath as a terminal of the condenser, has such malleability (that is, ability to be moved or deformed and to maintain the resultant shape or position) that when once forced into position around the interior condenser elements to hold them together with it in a unitary structure, it maintains such form and permanently provides a unitary structure. As indicated above, however, the enveloping sheath may be of conducting material (so that it may serve as a terminal of the condenser) and yet not possess a nature or be forced into a shape or position which thereby will hold all the parts together in a unitary structure; in which case other simple means may be employed to hold the parts together; or the interior parts may be forced into the interior of the sheath to be held therein permanently without deforming the sheath, which may be unyielding, either as by material or dimensions, or both.

While it is preferable to employ a tube of malleable metal for the enveloping sheath, yet neither a tube nor the use of malleable metal is necessary. But in the product, the enveloping sheath may be in the form of an enclosed flat tube, even although a cylindrical tube be not used initially in the process of manufacture, although the latter is the best and cheapest method thus far employed within the invention.

I claim:—

1. An electrical condenser which comprises a copper sheet constituting one of the conducting condenser-elements; two mica sheets on the respective sides thereof; and a copper tube extending around the sides of the mica-covered copper sheet, said copper tube constituting the other conducting condenser-element, and being substantially flat and in position to grip the outer faces of the mica sheets and force them against the intervening copper sheet and hold the mica and copper sheets together within the tube itself in a unitary structure therewith; the mica sheets extending out of and slightly beyond one end of the flat tube, and the copper sheet extending out of and beyond the same end of the tube and out of and beyond the extended mica sheets, the portion of the copper sheet which extends beyond the mica sheets constituting one terminal of the condenser; and the other end of the flat tube extending beyond the other ends of the mica sheets and the copper sheet to constitute the other terminal of the condenser.

2. An electrical condenser which comprises a copper sheet constituting one of the conducting condenser-elements; a copper tube extending around the sides thereof and constituting another of the conducting condenser-elements; and mica sheets electrically separating the copper tube from the copper sheet; said copper tube being flat and in position to grip the condenser sheets and hold them together in a unitary structure with the tube itself, said flat copper tube also constituting one terminal of the condenser; and an end of the copper sheet extending out of and beyond the flat tube to constitute the other terminal of the condenser.

3. An electrical condenser which comprises a conducting sheet constituting one of the conducting condenser-elements; a copper continuous tube extending around the sides of the conducting sheet and constituting another of the conducting condenser-elements; dielectric sheets electrically separating the copper tube from the conducting sheet, said copper tube being flat and in position to grip and gripping the dielectric and conducting sheets together and holding them in a unitary structure with one another and the tube itself.

4. An electrical condenser which comprises a conducting sheet constituting one of the conducting condenser-elements; a sheath of malleable metal extending around the sides of the conducting sheet and constituting another of the conducting condenser-elements; dielectric sheets electrically separating the metal sheath from the conducting sheet, said metal sheath being flat and in position to grip and gripping the dielectric and conducting sheets together and holding them in a unitary structure with one another and with the sheath itself.

5. An electrical condenser which comprises a conducting sheet constituting one of the conducting condenser-elements; a sheath of malleable metal surrounding the sides of said sheet and constituting another conducting condenser-element; and dielectric sheets electrically separating the conducting sheet from the metal enveloping sheath; said malleable metal sheath being in position to grip and gripping the dielectric sheets and holding them and the intervening conducting sheet in a unitary structure with one another and with itself.

6. A capacitor comprising a continuous tube, an armature within said tube, and sheets of insulating material between said armature and tube, the tube being bent to clamp said insulating material against said armature and constituting an armature of said capacitor, and there being a space between the tube and the side edges of said armature.

7. A capacitor comprising a continuous tube, a single armature member within said tube, and sheets of insulating material between said armature and tube, the tube being bent to clamp said insulating material against said armature, and the insulating material being mica sheets which are bent slightly over both side edges of the armature.

8. A capacitor comprising a tube, an armature within said tube, and sheets of insulating material between said armature and tube, the tube being bent to clamp said insulating material against said armature, the insulating material being mica sheets which are bent slightly over both side edges of the armature, and said tube being deformed adjacent one end beyond the end of the armature to constitute an abutment for the mica and armature.

9. An electrical condenser, which consists of a conducting sheet constituting a conducting condenser-element and one terminal of the condenser, and a flat conducting tube constituting another conducting condenser-element and the other terminal of the condenser; and dielectric sheets separating the respective conducting condenser-elements from one another.

10. A capacitor comprising a tube, an armature within said tube, sheets of insulating material between the armature and tube, the tube being bent to clamp the insulating material against the armature, and being deformed adjacent one end between the end of the armature to constitute an abutment for the insulating material and the armature.

VICTOR E. ROSEN.